United States Patent [19]
Goetz et al.

[11] Patent Number: 5,648,407
[45] Date of Patent: Jul. 15, 1997

[54] CURABLE RESIN SOLS AND FIBER-REINFORCED COMPOSITES DERIVED THEREFROM

[75] Inventors: Douglas P. Goetz; Andrew M. Hine, both of St. Paul; William J. Schultz, Vadnais Heights; Wendy L. Thompson, Roseville, all of Minn.

[73] Assignee: Minnesota Mining and Manufacturing Company, St. Paul, Minn.

[21] Appl. No.: 442,026

[22] Filed: May 16, 1995

[51] Int. Cl.$^6$ .................................................. C08K 9/01
[52] U.S. Cl. ........................ 523/213; 524/407; 524/408; 524/409; 524/413; 524/430; 524/431; 524/435; 524/437
[58] Field of Search ....................... 523/213; 524/413, 524/430, 431, 437, 407, 409, 408, 435

[56] References Cited

U.S. PATENT DOCUMENTS

| | | | |
|---|---|---|---|
| H1029 | 3/1992 | Reinhart | 523/220 |
| 2,801,185 | 7/1957 | Iler | 106/288 |
| 3,018,262 | 1/1962 | Schroeder | 260/29.2 |
| 3,298,996 | 1/1967 | Nelson | 260/45.85 |
| 3,298,998 | 1/1967 | McConnell et al. | 260/47 |
| 3,562,223 | 2/1971 | Bargain et al. | 260/78 |
| 3,627,780 | 12/1971 | Bonnard et al. | 260/326.3 |
| 3,689,300 | 9/1972 | Bunger et al. | 106/287 |
| 3,801,427 | 4/1974 | Morishita et al. | 161/162 |
| 3,839,358 | 10/1974 | Bargain | 260/326.26 |
| 4,049,861 | 9/1977 | Nozari | 428/220 |
| 4,100,140 | 7/1978 | Zahir et al. | 526/90 |
| 4,157,360 | 6/1979 | Prevorsek et al. | 260/860 |
| 4,211,823 | 7/1980 | Suzuki et al. | 428/412 |
| 4,468,497 | 8/1984 | Street et al. | 525/422 |
| 4,522,958 | 6/1985 | Das et al. | 523/212 |
| 4,525,421 | 6/1985 | Kubota et al. | 428/412 |
| 4,684,678 | 8/1987 | Schultz et al. | 523/466 |
| 4,778,716 | 10/1988 | Thorfinnson et al. | 428/236 |
| 4,900,848 | 2/1990 | Saito et al. | 549/517 |
| 4,902,537 | 2/1990 | Yamada et al. | 427/386 |
| 4,992,325 | 2/1991 | Kim et al. | 428/241 |
| 5,015,670 | 5/1991 | Takada et al. | 523/214 |
| 5,019,607 | 5/1991 | Coltrain et al. | 523/435 |
| 5,023,140 | 6/1991 | Glotfelter et al. | 428/413 |
| 5,087,603 | 2/1992 | Izubayashi et al. | 503/226 |
| 5,120,339 | 6/1992 | Markovich et al. | 65/3.1 |
| 5,260,121 | 11/1993 | Gardner et al. | 428/224 |
| 5,266,610 | 11/1993 | Malhotra et al. | 523/201 |
| 5,368,922 | 11/1994 | Portelli et al. | 428/229 |
| 5,401,793 | 3/1995 | Kobayashi et al. | 524/401 |

FOREIGN PATENT DOCUMENTS

| | | | |
|---|---|---|---|
| 0 483 818 A2 | 5/1992 | European Pat. Off. | C09D 163/02 |
| 0 484 123 A1 | 5/1992 | European Pat. Off. | C07F 7/18 |
| 61-296020 | 12/1986 | Japan . | |
| 40-02876 | 1/1992 | Japan . | |
| 70-62214 | 3/1995 | Japan . | |

OTHER PUBLICATIONS

M. Hussain et al., "Effects of Nano–Sized Filler Dispersion on Mechanical Properties of Carbon Fiber Reinforced Epoxy Composites", Materials Processing and Design: Grain–Boundary–Controlled Properties of Fine Ceramics II, *Ceramic Transactions*, vol. 44, pp. 409–415, Westerville, Ohio (1994).

*Primary Examiner*—Edward J. Cain
*Attorney, Agent, or Firm*—Gary L. Griswold; Walter N. Kirn; Lucy C. Weiss

[57] ABSTRACT

Compositions comprise (a) a curable resin sol comprising a colloidal dispersion of substantially spherical, substantially inorganic microparticles (e.g., surface-modified silica) in curable resin (e.g., epoxy resin); and (b) reinforcing fibers (e.g., carbon fibers). The compositions can be cured to provide fiber-reinforced composites which exhibit improved resin-dominated mechanical properties.

35 Claims, No Drawings

CURABLE RESIN SOLS AND FIBER-REINFORCED COMPOSITES DERIVED THEREFROM

FIELD OF THE INVENTION

This invention relates to compositions comprising curable resin, to fiber-reinforced composites derived therefrom, and to methods of improving the mechanical properties of fiber-reinforced composites.

BACKGROUND OF THE INVENTION

Advanced structural composites are high modulus, high strength materials useful in many applications requiring high strength to weight ratios, e.g., applications in the automotive, sporting goods, and aerospace industries. Such composites typically comprise reinforcing fibers (e.g., carbon or glass) embedded in a cured resin matrix.

A number of the deficiencies of advanced composites result from limitations of the matrix resins used in the fabrication of the composites. Resin-dependent properties include composite compression strength and shear modulus (which are dependent on the resin modulus) and impact strength (which is dependent on the resin fracture toughness). Various methods of improving these resin-dependent composite properties have been attempted. For example, elastomeric fillers (such as carboxyl-, amino-, or sulfhydryl-terminated polyacrylonitrile-butadiene elastomers) have been incorporated, thermoplastics (such as polyether imides or polysulfones) have been incorporated, and the crosslink density of the matrix resin has been decreased by using monomers of higher molecular weight or lower functionality. Such methods have indeed been effective at increasing resin fracture toughness and composite impact strength. But, unfortunately, the methods have also produced a decrease in the resin modulus and, accordingly, a decrease in the compression strength and shear modulus of composites made from the resins. (And the methods have tended to degrade the high temperature properties of the composites, as well.) Thus, composites prepared by these methods have had to be thicker and therefore heavier in order to exhibit the compressive and shear properties needed for various applications.

Other methods have focused on increasing the modulus of matrix resins as a means of increasing composite compressive and shear properties. For example, "fortifiers" or anti-plasticizers have been utilized. Such materials do increase the modulus of cured epoxy networks but also significantly reduce glass transition temperature and increase moisture absorption. Thus, the materials are unsatisfactory for use in high performance composite matrix resins.

Conventional fillers (fillers having a particle size greater than one micron) can also be used to increase the modulus of cured thermosetting resin networks, but such fillers are unsuitable for use in the fabrication of advanced composites for the following reasons. During the curing of a fiber-containing composite composition, resin flow sufficient to rid the composition of trapped air (and thereby enable the production of a composite which is free of voids) is required. As the resin flows, finer denier fibers can act as filter media and separate the conventional filler particles from the resin, resulting in a heterogeneous distribution of filler and cured resin which is unacceptable. Conventional fillers also frequently scratch the surface of the fibers, thereby reducing fiber strength. This can severely reduce the strength of the resulting composite.

Amorphous silica microfibers or whiskers have also been added to thermosetting matrix resins to improve the impact resistance and modulus of composites derived therefrom. However, the high aspect ratio of such microfibers can result in an unacceptable increase in resin viscosity, making processing difficult and also limiting the amount of microfiber that can be added to the matrix resin.

Accordingly, there is a need in the art for methods of producing matrix resin systems that are high in both fracture toughness and modulus, and which therefore provide composites exhibiting high toughness as well as high compressive and shear properties. Such methods should also maintain the low viscosity and easy processability of conventional resin systems.

SUMMARY OF THE INVENTION

Briefly, in one aspect, this invention provides compositions comprising (a) a curable resin sol comprising a colloidal dispersion of substantially spherical, substantially inorganic microparticles (e.g., surface-modified silica) in curable resin (e.g., epoxy resin); and (b) reinforcing fibers (e.g., carbon fibers). Preferably, the compositions are essentially volatile-free, i.e., essentially free of volatile materials released or formed during the cure of the compositions. The term "curable," as used herein, means chemically or physically crosslinkable to form a glassy, insoluble, non-flowable network which is maintained under normal use conditions.

The compositions of the invention can be cured to provide fiber-reinforced composites which exhibit improved resin-dominated mechanical properties, e.g., impact resistance, shear modulus, and compression strength (relative to the corresponding cured compositions without microparticles). Surprisingly, toughness often is not just maintained but is actually improved, so that the cured compositions exhibit improved impact resistance as well as improved shear modulus and/or compression strength.

Furthermore, the compositions of the invention are low in viscosity and are therefore readily processable, e.g., by hot-melt techniques. The compositions retain the typical cure profile of conventional curable resins, and the resulting cured materials exhibit minimal change in glass transition temperature and minimal deterioration in thermal stability, environmental resistance, or moisture absorption (relative to the corresponding cured compositions without microparticles). The compositions thus satisfy the need in the art for easily processable compositions which upon curing exhibit improved compression strength and/or shear modulus with comparable or even improved toughness.

In other aspects, this invention provides composites comprising the cured compositions of the invention, articles comprising the composites, prepregs comprising the compositions of the invention, a process for preparing composites having improved toughness and improved shear modulus (and composites and articles prepared thereby), and various novel curable resin sols.

DETAILED DESCRIPTION OF THE INVENTION

Curable resins suitable for use in the compositions of the invention are those resins, e.g., thermosetting resins and radiation-curable resins, which are capable of being cured to form a glassy network polymer. Suitable resins include, e.g., epoxy resins, curable imide resins (especially maleimide resins, but also including, e.g., commercial K-3 polyimides (available from dupont) and polyimides having a terminal reactive group such as acetylene, diacetylene, phenylethynyl, norbornene, nadimide, or benzocyclobutane), vinyl ester resins and acrylic resins (e.g., (meth)acrylic esters or amides of polyols, epoxies, and amines), bisbenzocyclobutane resins, polycyanate ester resins, and mixtures thereof. The resins can be utilized in the form of either monomers or prepolymers. Preferred curable resins include epoxy resins, maleimide resins, polycyanate ester resins, and mixtures thereof. Epoxy resins are especially preferred due to their processing characteristics, high temperature properties, and environmental resistance.

Epoxy resins are well-known in the art and comprise compounds or mixtures of compounds which contain one or more epoxy groups of the structure

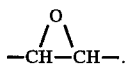

The compounds can be saturated or unsaturated, aliphatic, alicyclic, aromatic, or heterocyclic, or can comprise combinations thereof. Compounds which contain more than one epoxy group (i.e., polyepoxides) are preferred.

Polyepoxides which can be utilized in the compositions of the invention include, e.g., both aliphatic and aromatic polyepoxides, but aromatic polyepoxides are preferred for high temperature applications. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. The most preferred aromatic polyepoxides are the polyglycidyl ethers of polyhydric phenols.

Representative examples of aliphatic polyepoxides which can be utilized in the compositions of the invention include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the compositions of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 (Schoeder) and 3,298,998 (Coover et al.), the descriptions of which are incorporated herein by reference, as well as the derivatives described in the *Handbook of Epoxy Resins* by Lee and Neville, McGraw-Hill Book Co., New York (1967) and in *Epoxy Resins, Chemistry and Technology*, Second Edition, edited by C. May, Marcel Dekker, Inc., New York (1988), and mixtures thereof. A preferred class of polyglycidyl ethers of polyhydric phenols for use in the compositions of the invention are the diglycidyl ethers of bisphenol that have pendant carbocyclic groups, e.g., those described in U.S. Pat. No. 3,298,998 (Coover et al.), the description of which is incorporated herein by reference. Examples of such compounds include 2,2-bis[4-(2,3-epoxypropoxy)phenyl]norcamphane and 2,2-bis[4-(2,3-epoxypropoxy)phenyl]decahydro-1,4,5,8-dimethanonaphthalene. A preferred compound is 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), the description of which is incorporated herein by reference, as well as by other methods described by Lee and Neville and by May, supra. Many epoxy resins are also commercially available.

Maleimide resins suitable for use in the compositions of the invention include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. Nos. 3,562,223 (Bargain et al.), 3,627,780 (Bonnard et al.), 3,839,358 (Bargain), and 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a wide variety of unsaturated organic compounds, particularly those having multiple unsaturation, either ethylenic, acetylenic, or both. Examples include acrylic acids and amides and the ester derivatives thereof, e.g, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; α-methyl styrene; chlorostyrene; p-phenylstyrene; p-methylstyrene; t-butylstyrene; and phenyl vinyl ether. Of particular interest are resin systems employing a bismaleimide in combination with a bis(alkenylphenol). Descriptions of a typical resin system of this type are found in U.S. Pat. No. 4,100,140 (Zahir et al.), the descriptions of which are incorporated herein by reference. Particularly preferred components are 4,4'-bismaleimidodiphenylmethane and o,o'-diallyl bisphenol A.

Polycyanate ester resins suitable for use in the compositions of the invention can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri- and higher functionality cyanate resins are also suitable.

Microparticles suitable for use in the compositions of the invention are substantially spherical in shape, colloidal in size (e.g., having an average particle diameter in the range of from about 1 nanometer (1 millimicron) to about 1 micrometer (1 micron)), and substantially inorganic in chemical composition. Colloidal silica is preferred, but other colloidal metal oxides, e.g., colloidal titania, colloidal alumina, colloidal zirconia, colloidal vanadia, colloidal chromia, colloidal iron oxide, colloidal antimony oxide, colloidal tin oxide, and mixtures thereof, can also be utilized. The colloidal microparticles can comprise essentially a single oxide such as silica or can comprise a core of an oxide of one type (or a core of a material other than a metal oxide) on which is deposited an oxide of another type. Generally, the microparticles can range in size (average particle diameter) from about 5 nanometers to about 500 nanometers, preferably from about 10 nanometers to about 300 nanometers, more preferably from about 10 nanometers to about 100 nanometers.

It is also preferable that the colloidal microparticles be relatively uniform in size and remain substantially non-aggregated, as microparticle aggregation can result in precipitation, gellation, or a dramatic increase in sol viscosity. Thus, a particularly desirable class of microparticles for use in preparing the compositions of the invention includes sols of inorganic microparticles (e.g., colloidal dispersions of inorganic microparticles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., the descriptions of the techniques and forms given in U.S. Pat. Nos. 2,801,185 (Iler) and 4,522,958 (Das et al.), which descriptions are incorporated herein by reference, as well as those given by R. K. Iler in *The Chemistry of Silica*, John Wiley & Sons, New York (1979).

Due to their surface chemistry and commercial availability, silica hydrosols are preferred for use in preparing the compositions of the invention. Such hydrosols are available in a variety of particle sizes and concentrations from, e.g., Nyacol Products, Inc. in Ashland, Md.; Nalco Chemical Company in Oakbrook, Ill.; and E. I. dupont de Nemours and Company in Wilmington, Del. Concentrations of from about 10 to about 50 percent by weight of silica in water are generally useful, with concentrations of from about 30 to about 50 weight percent being preferred (as there is less water to be removed). If desired, silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols, e.g., electrodialysis, ion exchange of sodium silicate, hydrolysis of silicon compounds, and dissolution of elemental silicon are described by Iler, supra.

In preparing the compositions of the invention, a curable resin sol can generally be prepared first and then combined with reinforcing fibers. Preparation of the curable resin sol generally requires that at least a portion of the surface of the inorganic microparticles be modified so as to aid in the dispersibility of the microparticles in the resin. This surface modification can be effected by various different methods which are known in the art. (See, e.g., the surface modification techniques described in U.S. Pat. Nos. 2,801,185 (Iler) and 4,522,958 (Das et al.), which descriptions are incorporated herein by reference.)

For example, silica microparticles can be treated with monohydric alcohols, polyols, or mixtures thereof (preferably, a saturated primary alcohol) under conditions such that silanol groups on the surface of the particles chemically bond with hydroxyl groups to produce surface-bonded ester groups. The surface of silica (or other metal oxide) particles can also be treated with organosilanes, e.g., alkyl chlorosilanes, trialkoxy arylsilanes, or trialkoxy alkylsilanes, or with other chemical compounds, e.g., organotitanates, which are capable of attaching to the surface of the particles by a chemical bond (covalent or ionic) or by a strong physical bond, and which are chemically compatible with the chosen resin(s). Treatment with organosilanes is generally preferred. When aromatic ring-containing epoxy resins are utilized, surface treatment agents which also contain at least one aromatic ring are generally compatible with the resin and are thus preferred.

In preparing the curable resin sols, a hydrosol (e.g., a silica hydrosol) can generally be combined with a water-miscible organic liquid (e.g., an alcohol, ether, amide, ketone, or nitrile) and, optionally (if alcohol is used as the organic liquid), a surface treatment agent such as an organosilane or organotitanate. Alcohol and/or the surface treatment agent can generally be used in an amount such that at least a portion of the surface of the microparticles is modified sufficiently to enable the formation of a stable curable resin sol (upon combination with curable resin, infra). Preferably, the amount of alcohol and/or treatment agent is selected so as to provide particles which are at least about 50 weight percent metal oxide (e.g., silica), more preferably, at least about 75 weight percent metal oxide. (Alcohol can be added in an amount sufficient for the alcohol to serve as both diluent and treatment agent.) The resulting mixture can then be heated to remove water by distillation or by azeotropic distillation and can then be maintained at a temperature of, e.g., about 100° C. for a period of, e.g., about 24 hours to enable the reaction (or other interaction) of the alcohol and/or other surface treatment agent with chemical groups on the surface of the microparticles. This provides an organosol comprising microparticles which have surface-attached or surface-bonded organic groups ("substantially inorganic" microparticles).

The resulting organosol can then be combined with a curable resin and the organic liquid removed by, e.g., using a rotary evaporator. (The removal of the organic liquid can, alternatively, be delayed until after combination with reinforcing fibers, if desired.) Preferably, the organic liquid is removed by heating under vacuum to a temperature sufficient to remove even tightly-bound volatile components. Stripping times and temperatures can generally be selected so as to maximize removal of volatiles while minimizing advancement of the resin. Failure to adequately remove volatiles at this stage leads to void formation during the curing of the composition, resulting in deterioration of thermomechanical properties in the cured composites. (This is a particularly severe problem in the fabrication of structural composites, where the presence of voids can have a disastrous effect on physical properties.) Unremoved volatiles can also plasticize the cured resin network and thereby degrade its high temperature properties. Generally, resin sols having volatile levels less than about 2 weight percent (preferably, less than about 1.5 weight percent) provide void-free composites having the desired thermomechanical properties.

Removal of volatiles can result in gel formation (due to loss of any surface-bound volatiles), if the above-described surface treatment agent is not properly chosen so as to be compatible with the curable resin, if the agent is not tightly-bound to the microparticle surface, and/or if an incorrect amount of agent is used. As to compatibility, the treated particle and the resin should generally have a positive enthalpy of mixing to ensure the formation of a stable sol. (Solubility parameter can often be conveniently used to accomplish this by matching the solubility parameter of the surface treatment agent with that of the curable resin.) Removal of the volatiles provides curable resin sols, which can generally contain from about 3 to about 50 volume percent (preferably, from about 4 to about 30 volume percent) substantially inorganic microparticles.

The compositions of the invention can be prepared by combining the curable resin sol with reinforcing fibers (preferably, continuous reinforcing fibers). Suitable fibers include both organic and inorganic fibers, e.g., carbon or graphite fibers, glass fibers, ceramic fibers, boron fibers, silicon carbide fibers, polyimide fibers, polyamide fibers, polyethylene fibers, and the like, and combinations thereof. Fibers of carbon, glass, or polyamide are preferred due to considerations of cost, physical properties, and processability. Such fibers can be in the form of a unidirectional array of individual continuous fibers, woven fabric, knitted fabric, yarn, roving, braided constructions, or non-woven mat. Generally, the compositions can contain, e.g., from about 30 to about 80 (preferably, from about 45 to about 70) volume percent fibers, depending upon structural application requirements.

The compositions can further comprise additives such as curing agents, cure accelerators, catalysts, crosslinking agents, dyes, flame retardants, pigments, impact modifiers (e.g., rubbers or thermoplastics), and flow control agents. Epoxy resins can be cured by a variety of curing agents, some of which are described (along with a method for calculating the amounts to be used) by Lee and Neville in *Handbook of Epoxy Resins,* McGraw-Hill, pages 36–140, New York (1967). Useful epoxy resin curing agents include polyamines such as ethylenediamine, diethylenetriamine, aminoethylethanolamine, and the like, diaminodiphenylsulfone, 9,9-bis(4-aminophenyl)fluorene, 9,9-bis(3-chloro-4-(aminophenyl)fluorene, amides such as dicyandiamide, polycarboxylic acids such as adipic acid, acid anhydrides such as phthalic anhydride and chlorendic anhydride, and polyphenols such as bisphenol A, and the like. Generally, the epoxy resin and curing agent are used in stoichiometric amounts, but the curing agent can be used in amounts ranging from about 0.1 to 1.7 times the stoichiometric amount of epoxy resin.

Thermally-activated catalytic agents, e.g., Lewis acids and bases, tertiary amines, imidazoles, complexed Lewis acids, and organometallic compounds and salts, can also be utilized in curing epoxy resins. Thermally-activated catalysts can generally be used in amounts ranging from about 0.05 to about 5 percent by weight, based on the amount of epoxy resin present in the curable resin composition.

N,N'-bismaleimide resins can be cured using diamine curing agents, such as those described in U.S. Pat. No. 3,562,223 (Bargain et al.), the description of which is incorporated herein by reference. Generally, from about 0.2 to about 0.8 moles of diamine can be used per mole of N,N'-bismaleimide. N,N'-bismaleimides can also cure by other mechanisms, e.g., co-cure with aromatic olefins (such as bis-allylphenyl ether, 4,4'-bis(o-propenylphenoxy) benzophenone, or o,o'-diallyl bisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

The curable resin sols of the compositions of the invention can be used to make composite articles by a variety of conventional processes, e.g., resin transfer molding, filament winding, tow placement, resin infusion processes, or traditional prepreg processes. Prepregs can be prepared by impregnating an array of fibers (or a fabric) with the resin sol (or with a volatile organic liquid-containing resin sol) and then layering the impregnated tape or fabric. The resulting prepreg can then be cured by application of heat, along with the application of pressure or vacuum (or both) to remove any trapped air.

The curable resin sols can also be used to make composite parts by a resin transfer molding process, which is widely used to prepare composite parts for the aerospace and automotive industries. In this process, fibers are first shaped into a preform which is then compressed to final part shape in a metal mold. The sol can then be pumped into the mold and heat-cured. Both a low resin viscosity and a small particle size (less than 1 micron in average diameter) are important for this process so that the sol can flow through the compressed preform in a short amount of time, without particle separation or preform distortion.

Composites can also be prepared from the curable resin sols by a filament winding process, which is typically used to prepare cylinders or other composites having a circular or oval cross-sectional shape. In this process, a fiber tow or an array of tows is impregnated with the sol by running it through a resin bath (preferably, containing a low viscosity resin) and immediately winding the impregnated tow onto a mandrel. The resulting composite can then be heat-cured.

A pultrusion process (a continuous process used to prepare constant cross-section parts) can also be used to make composites from the curable resin sols. In such a process, a large array of continuous fibers is first wetted out in a resin bath (preferably, containing a low viscosity resin). The resulting wet array is then pulled through a heated die, where trapped air is squeezed out and the resin is cured.

The compositions of the invention are low in viscosity and are therefore readily processable, e.g., by hot-melt techniques. The rheological and curing characteristics of the compositions can be adjusted to match those required for a particular composite manufacturing process. The compositions can be cured by application of heat, electron beam radiation, microwave radiation, or ultraviolet radiation to form fiber-reinforced composites which exhibit improved compression strength and/or shear modulus and improved impact behavior (relative to the corresponding cured compositions without microparticles). This makes the composites well-suited for use in applications requiring structural integrity, e.g., applications in the transportation, construction, and sporting goods industries.

Objects and advantages of this invention are further illustrated by the following examples, but the particular materials and amounts thereof recited in these examples, as well as other conditions and details, should not be construed to unduly limit this invention. In the examples, all temperatures are in degrees Centigrade and all parts and percentages are by weight unless indicated otherwise.

EXAMPLES

Test Procedures
Volatiles Determination

Five gram samples of a curable resin sol and a pure resin (i.e., resin without microparticles) were placed in separate 5 cm diameter aluminum pans, the samples were placed in a 175° C. forced air oven for 30 minutes, and the sample weights were determined after the heating cycle. Percent volatiles were calculated using the following formula:

% Volatiles=[(original wt.−wt. after heating)/(original wt.)]×100

Volatile materials introduced by the pure resin were accounted for by introducing a correction factor using the following formula:

Corrected % Volatiles=(Curable Resin Sol % Volatiles)−(Pure Resin % Volatiles)

Open Hole Compression (OHC)

Open hole compression strength was measured using a specimen 3.81 cm wide and 30.48 cm long with a nominal thickness of 0.254 cm and having a 0.635 cm diameter hole drilled in the middle of the specimen. The compression strength was measured using a mechanical testing machine and the procedure described in SACMA (Suppliers of Advanced Composite Materials Association) test method SRM-3.

Compression After Impact (CAI)

Compression After Impact was performed by first impacting a 10.16 cm×15.24 cm×0.51 cm panel with an impactor having a spherical tip of 1.59 cm radius at an impact energy of 66.73 J per cm of panel thickness. The residual compression strength was measured using a mechanical testing machine and the test procedure described in SACMA test method SRM-2.

Shear Modulus

Shear modulus of neat resin samples was determined with a Rheometrics Dynamic Analyzer, RDA-700 (available from Rheometrics, Inc., Piscataway), using a torsion rectangular test mode. Test specimens were machined from neat resin samples (5.08 cm×1.27 cm×0.15 cm). Data was collected at 5° C. intervals from 35° C. to above the glass transition temperature of the resin using a heating rate of 5° C./min. with a 1 min. thermal soak before each measurement was taken. The initial strain used in the measurement was 0.45%, and the machine was in the strain adjustment mode. The frequency used was 10 radians/second.

The shear modulus of composite specimens was measured in an identical manner to the neat resin samples with the exception that the initial strain was 0.05%.

Fracture Toughness ($K_{1c}$)

Fracture toughness was measured according to ASTM E399. Test specimens were nominally 0.65 cm thick with overall dimensions of 3.175 cm×3.048 cm.

Tensile Modulus

Tensile modulus was measured according to ASTM D638 test procedure using specimens having overall dimensions of 0.3 cm×1.9 cm×18.0 cm with a gage section of 1.3 cm×5.0 cm.

Glass Transition Temperature ($T_g$)

Glass transition temperatures were determined with a TA Instruments 912 Differential Scanning Calorimeter (available from TA Instruments, New Castle, Del.) using a heating rate of 40° C./min.

Materials Description

Nalco™ 2327—a 40% solids by weight suspension of 20 nm silica particles in water (available from Nalco Chemical Company, Chicago, Ill.)

Nalco™ 2329—a 40% solids by weight suspension of 75 nm silica particles in water (available from Nalco Chemical Company)

Nalco™ 1057 (formerly Nalco™ 84SS258)—a 31.7% solids suspension of 20 nm silica particles in 2-propoxyethanol (available from Nalco Chemical Company)

Phenyltrimethoxy silane (CAS No. 2996-92-1)—P0330 (available from United Chemical Technologies Inc., Bristol, Pa.)

Benzooxasilepin dimethyl ester (CAS No. 94158-47-1)—B1560 (available from United Chemical Technologies Inc.)

DER™ 332—a diglycidyl ether of bisphenol A having an epoxy equivalent weight of 175 (available from Dow Chemical Co., Freeport, Tex.)

Araldite™ PY 306—a diglycidyl ether of bisphenol F having an epoxy equivalent weight of 158 (available from Ciba Geigy Corp., Hawthorn, N.Y.)

Epon™ 828—a diglycidyl ether of bisphenol A having an epoxy equivalent weight of 188 (available from Shell Chemical Co., Houston, Tex.)

AroCy L-10—ethylidene bis-4,1-phenylene dicyanate (CAS No. 47073-92-7; available from Ciba Geigy Corp.)

Epon™ Curing Agent W (Curative W)—a liquid aromatic amine having an NH equivalent wt. of 44.5 (available from Shell Chemical Co.)

4,4'-Diaminodiphenyl sulfone—an aromatic amine curing agent having an NH equivalent weight of 62 (available from Aldrich Chemical Company, Milwaukee, Wis.)

9,9 bis(3-chloro-4-aminophenyl)fluorene (CAF)—an aromatic amine epoxy curative having an NH equivalent weight of 108, described in U.S. Pat. No. 4,684,678 (Schultz et al.)

Matrimid™ 5292A bismaleimide resin—N,N'-4,4'-diphenylmethanebismaleimide (available from Ciba Geigy Corp.)

Matrimid™ 5292B o-diallyl bisphenol A—4,4'-(1-methylethylidene)bis(2-(2-propenyl)phenol) (available from Ciba Geigy Corp.)

3-Glycidoxypropyltrimethoxysilane—(CAS No. 2530-83-8) G6720 (available from United Chemical Technologies Inc.)

2-(3-Cyclohexenyl)ethyltrimethoxysilane—(CAS No. 67592-36-3) C3555.5 (available from United Chemical Technologies Inc.)

p-(Chloromethyl)phenyltrimethoxysilane—(CAS No. 24413-04-5) C3277.4 (available from United Chemical Technologies Inc.)

N-Phenylaminopropyltrimethoxysilane—(CAS No. 3068-76-6) P0156 (available from United Chemical Technologies Inc.)

Phenethyltrimethoxysilane—(CAS No. 49539-88-0) P0113 (available from United Chemical Technologies Inc.)

2-(3,4-Epoxycyclohexyl)ethyltrimethoxysilane—(CAS No. 3388-04-3) E6250 (available from United Chemical Technologies Inc.)

Preparation of Organosols A, B, and C

Three different organosols were prepared using the following materials and procedure:

|  | Organosol A | Organosol B | Organosol C |
| --- | --- | --- | --- |
| Nalco ™ 2327 hydrosol | 1500 g | 1500 g | — |
| Nalco ™ 2329 | — | — | 1500 g |
| 2-Methoxyethanol | 3100 g | 3100 g | 3100 g |
| Phenyltrimethoxy silane | 61 g | — | 17.85 g |
| Benzooxasilepin dimethyl ester | — | 69 g | — |

2-Methoxyethanol was slowly added to a stirred hydrosol, followed by rapid addition of a surface treatment agent to the resulting mixture. (0.5 mmol of agent per gram of silica was used in the preparation of Organosols A & B, and 0.15 mmol of agent per gram of silica was used for the preparation of the larger particle size silica used in Organosol C). The mixture was heated to 100° C., and 650 grams of a water/2-methoxyethanol mixture were distilled (via the 85/15 water/methoxyethanol azeotrope). The resulting mixture was maintained at 95° C. for approximately 22 hours, after which additional 2-methoxyethanol was distilled from the mixture until a 25% solids suspension was obtained.

Example 1

Organosol A (160 g, 40 g of silica) was added to DER™ 332 epoxy resin (60 g). The resulting clear mixture was divided into 3 aliquots identified as 1A, 1B, and 1C. The aliquots were placed in individual recovery flasks, and 2-methoxyethanol was removed on a rotary evaporator. Epoxy resin sols were prepared by slowly heating each sample while applying a vacuum of 2 torr to aid in solvent removal. Sample A was heated to a final temperature of 120° C., sample B to 140° C., and sample C to 175° C. The samples were held at the final temperature for 60 minutes. Corrected volatiles were determined for each sample, the results of which are reported in Table 1. Cured epoxy resin sol samples were prepared by adding CAF (11.11 g, 0.1029 eq) to each epoxy resin sol sample (20.0 g, 0.0687 eq), degassing the resulting mixtures under vacuum at 25° C., pouring the degassed mixtures into 10 cm×10 cm×0.16 cm vertical molds, and curing the resulting samples in a forced air oven at 175° C. for 4 hours. The cured samples were used to determine the glass transition temperatures of the cured resins, which are also reported in Table 1.

TABLE 1

|  | Sample 1A | Sample 1B | Sample 1C |
| --- | --- | --- | --- |
| % Volatiles | 4.0% | 3.4% | 1.0% |
| $T_g$ | 151° C. | Not measured | 176° C. |

This example shows that conventional solvent stripping or removal techniques left significant solvent residues in the epoxy resin. Unless relatively high temperatures in conjunction with a high vacuum were used to remove solvent from the epoxy resin sol, solvent levels high enough to cause void formation in thicker cross-section epoxy resin sol or epoxy resin sol composite parts remained in the resin. The glass transition temperature data shows that residual volatiles also plasticized the resin networks, thereby reducing the glass transition temperatures of the cured samples. Subsequent experiments identified the volatile removed under vacuum at 175° C. as 2-methoxyethanol. Since the boiling point of 2-methoxyethanol at atmospheric pressure is 121° C., this suggests that the alcohol was somehow bound to the particle and required extreme conditions to remove it.

Example 2

An essentially volatile-free, 40% silica/epoxy resin sol was prepared using Organosol A (320.0 g) and DER™ 332 epoxy resin (120.0 g) essentially as described in Example 1. A curable epoxy resin sol composition, 2A, having 34.6% silica was prepared by adding a stoichiometric amount of Curative W (3.17 g) to the epoxy resin sol (20.0 g). An additional sample of a curable epoxy resin sol composition, 2B, having 20% silica in the cured resin, was prepared by adding a stoichiometric amount of Curative W (8.4 g) to a mixture of Organosol A (25.0 g) and DER™ 332 epoxy resin (16.5 g). The two curable epoxy resin sols were degassed, poured into vertical molds, and cured at 177° C. for 3 hours to produce two clear networks, 2A and 2B, containing 34.6% and 20% silica respectively. The cured epoxy resin sols were machined into specimens for measurement of shear modulus, fracture toughness, and glass transition temperature. Results of these tests are reported in Table 2.

Comparative Example C-1

A comparative resin, C-1, was prepared by adding Curative W (52.8 g) to DER™ 332 epoxy resin (200 g) and curing the mixture by essentially the same procedure used in preparing cured samples 2A and 2B of Example 2. The cured resin was machined into specimens appropriate for measurement of shear modulus, fracture toughness, and glass transition temperature. The properties of the resin are reported in Table 2.

TABLE 2

|  | Epoxy Resin Sol 2A | Epoxy Resin Sol 2B | Comparative Epoxy Resin C-1 |
| --- | --- | --- | --- |
| DSC $T_g$ | 198° C. | 196° C. | 196° C. |
| Resin Shear Modulus at 35° C. | 1.74 GPa | 1.34 GPa | 1.03 GPa |
| Resin Fracture Toughness | 0.68 MPa(m)$^{1/2}$ | 0.65 MPa(m)$^{1/2}$ | 0.55 MPa(m)$^{1/2}$ |

This data shows that improved fracture and modulus properties were obtained for the cured epoxy resin sols relative to the comparative epoxy resin, with maintenance of the high glass transition temperature ($T_g$) of the resin.

Example 3

Epoxy resin sol formulation 2A (500 g), prepared as described in Example 2, was coated onto Hercules IM7-G-12K intermediate modulus carbon fibers using a drum-winding prepregger available from Research Tool Corp. of Ovid, Mich. The epoxy resin sol was applied to the fibers by pulling the carbon fiber tow through a heated resin bath (60° C.), followed by pulling the coated tow through a precisely machined die opening which controlled the amount of resin added to the fiber. The die opening used in this example was 3.8 mm×0.146 mm, which produced an epoxy resin sol add-on level of 45% by weight. The resulting impregnated tow was continuously wound onto a slowly traversing drum (30.4 cm wide with a 183 cm circumference) to produce individual 30 cm×183 cm sheets of high quality unidirectional prepreg. The prepreg was cut into 22.86 cm×22.86 cm pieces, and the pieces were stacked to prepare an 8 ply unidirectional panel. The panel was bagged, and bleeders were added to absorb excess resin during the cure to reduce the final resin content of the cured panel to 35% by weight. The part was cured in an autoclave by applying a vacuum of 2 torr on the bag containing the panel while applying 620 Pa of pressure to the bag. The autoclave was heated from 20° C. to 177° C. at a rate of 2.78° C./min. until the temperature reached 177° C., where it was held for 180 minutes. The procedure produced a high quality, void-free composite panel, referred to as epoxy resin sol composite 3, having a fiber content of 65% by weight. The panel was machined into specimens to measure uniaxial compression by procedures described in SACMA SRM 1–88. The compression tests were performed at 25° C., 81° C., and 121° C., and the results are reported in Table 3.

Comparative Example C-2

A curable epoxy resin mixture (500 g) was prepared by adding a stoichiometric amount of Curative W (105.0 g) to DER™ 332 epoxy resin (395.0 g), essentially as described in Comparative Example C-1. The mixture was used to prepare unidirectional prepreg and subsequently a cured composite panel, essentially as described in Example 3. The panel was machined into specimens to measure uniaxial compression by procedures described in SACMA SRM 1–88. The compression tests were performed at 25° C., 81° C., and 121° C., and the results are reported in Table 3.

TABLE 3

| Test Temperature | Epoxy Resin Sol Composite 3 Compression Strength | Comparative Epoxy Composite C-2 Compression Strength |
| --- | --- | --- |
| 25° C. | 1434 MPa | 1124 MPa |
| 82° C. | 1338 MPa | 965 MPa |
| 121° C. | 1178 MPa | 896 MPa |

This data shows that the carbon fiber-containing composite prepared from the epoxy resin sol had superior compression strength (over a broad temperature range) relative to the comparative composite (containing no microparticles).

Example 4

An epoxy resin sol containing 18.0% colloidal silica by weight was prepared from Araldite™ PY 306 epoxy resin (988 g) and Organosol A (848 g) using essentially the process described in Example 1C. The epoxy resin sol had an epoxy equivalent weight of 191. A composition suitable for resin transfer molding (RTM) was prepared by adding CAF (864 g) to the Araldite™ PY 306 epoxy resin sol (1136 g). This resulted in a epoxy/NH stoichiometric ratio of 1/1.35. The composition was used to prepare RTM composite panels. 33 cm×33 cm pieces of plain weave IM-7 carbon fiber fabric (Hercules Inc. of Magna Utah) were stacked into a 33 cm×33 cm cavity of a heated metal mold. The depth of the cavity was adjusted to 0.318 cm for open hole compression (OHC) samples and to 0.635 cm for compression after impact (CAI) specimens by the addition of caul plates. Resin was pumped into the molds using a Graco pump (Graco, Inc., Franklin Park Ill.), and the panels were cured for four hours at 177° C. The fiber content of the cured composite panels was 67% by weight. The cured resin sol composite panels were machined into specimens to measure OHC and CAI. Test results are reported in Table 4.

Comparative Example C-3

A comparative epoxy RTM resin composition was prepared by adding CAF (960 g) to Araldite™ PY 306 epoxy resin (1040 g). This resulted in a epoxy/NH stoichiometric ratio of 1.0/1.35. Cured RTM composite panels were made essentially as described in Example 4. The fiber content of the cured composite panels was 67% fiber by weight. The cured epoxy resin composite panels were machined into specimens to measure OHC and CAI. Test results are reported in Table 4.

TABLE 4

|  | Epoxy Resin Sol of Example 4 | Comparative Epoxy Resin C-3 |
| --- | --- | --- |
| Composite OHC | 340 MPa | 296 MPa |
| Composite CAI | 360 MPa | 320 MPa |

This data shows improved composite compressive (OHC) and impact properties (CAI) for the composite of the invention, relative to the comparative composite (without microparticles).

Example 5

A cyanate ester resin sol was prepared by adding Organosol B (800 g) to AroCy L-10 cyanate ester resin (800 g) and devolatilizing the resulting mixture on a rotary evaporator. The final stripping operation maintained the sample at a temperature of 150° C. and a vacuum of 2 torr for 30 min. This procedure resulted in a cyanate ester resin sol containing 20% colloidal silica. A portion of this sample (approximately 100 g) was poured into vertical molds and cured 5 hours at 150° C., 15 hours at 177° C., and 1 hour at 250° C. This procedure produced a clear hard resin network containing 20% silica. The remainder of the sample (approximately 700 g) was used to make a carbon fiber prepreg, essentially as described in Example 3. The prepreg was cured in an autoclave using the same cure schedule as the cyanate ester resin sol to produce a void-free composite panel containing 65 weight % carbon fiber. The neat resin sol bricks were machined into specimens for the measurement of resin shear modulus and fracture toughness, and the composite panel was machined into specimens to measure composite compression strength and shear modulus. Results of these measurements are reported in Table 5.

Comparative Example C-4

AroCy L-10 cyanate ester resin was poured into vertical molds and cured 5 hours at 150° C., 15 hours at 177° C., and 1 hour at 250° C. The resin was also used to make a carbon fiber prepreg, essentially as described in Example 5. The resulting neat resin bricks were machined into specimens for the measurement of resin shear modulus and fracture toughness, and the resulting composite panel was machined into specimens to measure composite compression strength and shear modulus. Results of these measurements are reported in Table 5.

TABLE 5

|  | Cyanate Ester Resin Sol of Example 5 | Comparative Cyanate Ester Resin C-4 |
| --- | --- | --- |
| Neat Resin Shear Modulus | 1.72 GPa | 1.29 GPa |
| Neat Resin Fracture Toughness | 0.787 MPa(m)$^{1/2}$ | 0.578 MPa(m)$^{1/2}$ |
| Composite Shear Modulus | 7.2 GPa | 4.6 GPa |
| Composite Compression Strength | 1627 MPa | 1385 MPa |

This data shows that improved matrix resin properties and improved composite properties were obtained for the cyanate ester resin sol relative to the comparative cyanate ester resin (without microparticles).

Example 6

An epoxy resin sol containing 40% silica by weight was prepared by adding Organosol C (800.0 g) to Epon™ 828 epoxy resin (300.0 g), essentially as described in Example 1C. A stoichiometric amount of Curative W (73.9 g) was added to the epoxy resin sol (500 g) resulting in a final 35% silica concentration. The epoxy resin sol (approximately 100 g) was cured into neat resin sol bricks by pouring into vertical molds and heating for 3 hours at 177° C. The remainder of the epoxy resin sol (approximately 475 g) was used to prepare a unidirectional prepreg by essentially the procedure described in Example 3. The prepreg was used to fabricate an eight ply unidirectional panel which was cured for 3 hours at 177° C. The resulting neat resin sol bricks were machined into test specimens for the measurement of resin shear modulus and fracture toughness, and the resulting composite panel was machined into specimens for the measurement of composite compression strength and shear modulus. Results of the measurements are reported in Table 6.

Example 7

An epoxy resin sol was prepared essentially by the procedure described in Example 6, except that Organosol C (470.0 g) was added to Epon™ 828 epoxy resin (382.0 g), followed by the addition of Curative W (94 g), resulting in a final 20% silica concentration. The resulting sol was used to make neat resin sol bricks and composites, which were converted into test specimens and tested essentially as described in Example 6. Results of the testing are reported in Table 6.

Example 8

An epoxy resin sol was prepared by adding Organosol A (470.0 g) to Epon™ 828 epoxy resin (382.0 g) essentially as described in Example 1C, followed by the addition of Curative W (94 g) to produce an epoxy resin sol (590.4 g) having a final 20% silica concentration. The epoxy resin sol was used to make neat resin sol bricks and composite, essentially as described in Example 6. Results of the testing of the bricks and composite are reported in Table 6.

Example 9

An epoxy resin sol was prepared by adding Organosol A (800.0 g) to Epon™ 828 epoxy resin (300.0 g), essentially as described in Example 1C, followed by the addition of Curative W (73.9 g) to produce an epoxy resin sol (574.6 g) having a final 35% silica concentration. The epoxy resin sol was used to make neat resin sol bricks and composite, essentially as described in Example 6. Results of the testing of the bricks and composite are reported in Table 6.

Example 10

An epoxy resin sol was prepared by adding Organosol A (488.0 g) to Epon™ 828 epoxy resin (367.0 g) essentially as described in Example 1C, followed by the addition of diaminodiphenyl sulfone (122.0 g), to produce an epoxy resin sol (611 g) having a final 20% silica concentration. The epoxy resin sol was used to make neat resin sol bricks and composite essentially as described in Example 6. Results of the testing of the bricks and composite are reported in Table 6.

Comparative Example C-5

2 micron diameter glass spheres (117.5 g, Spheriglass Solid Spheres, designation 10002/2 micron, CAS No.65997-17-3, available from Potters Industries Inc., Carlstadt, N.J.,) were added to Epon™ 828 epoxy resin (382.5 g) containing a stoichiometric amount of Curative W (94 g) to produce a dispersion having 20% glass spheres by weight. This dispersion was used to prepare a carbon fiber prepreg and a cured composite panel. This dispersion was very difficult to prepreg because of the filtration of the spheres on the surface of the fiber tows. The composite physical properties are reported in Table 6.

Comparative Example C-6

A stoichiometric amount of Curative W (123.0 g) was added to Epon™ 828 epoxy resin (500.0 g). A portion of the resulting mixture (approximately 100.0 g) was used to make neat resin bricks, and the remainder (approximately 519.0 g) was used to prepare a carbon fiber prepreg and a cured composite panel. The neat resin bricks and the composite were prepared essentially as described in Example 6. Results of physical properties testing are reported in Table 6.

Comparative Example C-7

A stoichiometric amount of diaminodiphenyl sulfone (150.0 g) was added to Epon™ 828 epoxy resin (450.0 g). A portion of the resulting mixture (approximately 100 g) was used to make neat resin bricks, and the remainder (approximately 500 g) was used to prepare a carbon fiber prepreg and a cured composite panel. The neat resin bricks and composite were prepared essentially as described in Example 6. Results of the physical properties testing are reported in Table 6.

TABLE 6

| Example No. | Resin Shear Modulus (GPa) | Resin Fracture Toughness (MPa(m)$^{1/2}$) | Composite Shear Modulus (GPa) | Composite Compression Strength (MPa) |
| --- | --- | --- | --- | --- |
| 6 | 1.70 | 0.765 | 10.30 | 1800 |
| 7 | 1.34 | 0.680 | 7.60 | 1496 |
| 8 | 1.41 | 0.623 | 6.60 | 1600 |
| 9 | 1.84 | 0.690 | 8.50 | 1675 |
| 10 | 1.65 | 0.723 | 6.60 | 1675 |
| C-5 | not measured | not measured | not measured | 1110 |
| C-6 | 1.10 | 0.581 | 5.0 | 1317 |
| C-7 | 1.32 | 0.539 | 5.60 | 1345 |

A comparison of the physical properties data for Examples 6, 7, 8, & 9 with that for Comparative Example C-6 shows that superior matrix resin and composite properties were obtained for the cured epoxy resin sols of Examples 6–9 relative to cured epoxy resin C-6 (containing no microparticles). Similarly, a comparison of the physical properties data for Example 10 (a diaminodiphenyl sulfone-cured epoxy resin sol) with that for Comparative Example C-7 (a diaminodiphenyl sulfone-cured epoxy resin) shows that superior properties were obtained for the epoxy resin sol and associated composite. Comparative Example C-5 (containing a silica filler having a large particle size (2.3 microns)) showed very poor compressive performance (relative to the compositions of the invention, which contain colloidal microparticles) due to filtration of the large particles.

Example 11

Organosol B (646 g) was added to Matrimid™ 5292B o-diallyl bisphenol A (300 g), and the resulting resin sol was devolatilized essentially as described in Example 1C to produce an o-diallyl bisphenol A resin sol having a 35% silica concentration. An uncured bismaleimide (BMI) resin sol was then prepared by dissolving Matrimid™ 5292A bismaleimide resin (300 g) in the Matrimid™ 5292B resin sol (392 g) at 150° C. A portion (approximately 100 g) of the uncured bismaleimide resin sol was poured into vertical molds essentially as described in Example 2 and cured for 1 hour at 180° C., 2 hours at 200° C., and 6 hours at 250° C. The remainder (approximately 625 g) of the uncured BMI resin sol was used to make a carbon fiber prepreg and subsequently cured into composite panels using essentially the same cure schedule that was used for the BMI resin sol. The neat resin sol bricks and composite panel were machined into test specimens and tested essentially as for previous samples. Results of the testing are reported in Table 7.

Comparative Example C-8

Matrimid™ 5292A bismaleimide resin (300 g) was dissolved in Matrimid™ 5292B o-diallyl bisphenol A (255 g) by heating the mixture to 150° C. A portion of the resulting resin was cured into a resin network, and the remainder was used to prepare a carbon fiber prepreg which was subsequently cured into a composite panel. The cure protocol was essentially identical to that used in Example 11. The resulting neat resin bricks and composite panel were machined into specimens and tested. The results of the testing are reported in Table 7.

TABLE 7

|  | BMI Resin Sol of Example 11 | Comparative Resin C-8 |
| --- | --- | --- |
| Resin Shear Modulus (GPa) | 2.05 | 1.50 |
| Resin Fracture Toughness (MPa(m)$^{1/2}$) | 0.811 | 0.627 |
| Composite Shear Modulus (GPa) | 6.60 | 4.30 |

The data in Table 7 shows that improved matrix resin and composite properties were obtained for the BMI resin sol relative to the comparative BMI resin (without microparticles).

Example 12

The epoxy resin sol of Example 9 was used to prepare a glass fiber prepreg using Owens-Corning 456-BG-370 E-glass fiber, using essentially the fiber prepreg procedure of Example 3 (but substituting the glass fiber for the carbon fiber). Composite panels were fabricated and cured essentially as in Example 9. The composite panels were machined into test specimens, and the test results are reported in Table 8.

Comparative Example C-9

A stoichiometric amount of Curative W (98.0 g) was added to Epon™ 828 epoxy resin (400.0 g), and the resulting resin mixture was used to prepare a glass fiber composite panel essentially as in Example 12. The composite panel was machined into test specimens, and the test results are reported in Table 8.

TABLE 8

|  | Example 12 | Comparative Example C-9 |
| --- | --- | --- |
| Composite Shear Modulus | 640 GPa | 570 GPa |
| Composite Compression Strength | 148 MPa | 1296 MPa |

The data in Table 8 shows that improved glass fiber composite properties were obtained when an epoxy resin sol was used in place of a conventional epoxy resin.

Example 13

A colloidal silica resin sol was prepared using essentially the general procedures described in EP 483,818 A2 (The Dow Chemical Co.). Nalco™ 1057 hydrosol (282 g) was added to Epon™ 828 epoxy resin (300 g), and the resulting mixture was heated to 140° C. and held at that temperature for 10 minutes. A vacuum of 12 torr was applied to the mixture, the mixture was held at 140° C. for 15 minutes, and then the temperature of the mixture was slowly raised to 177° C. and held at that temperature for 60 minutes. This procedure resulted in an essentially volatile-free, colloidal silica resin sol that was 23% silica by weight. A stoichiometric amount of Curative W (61.0 g) was added to the sol to obtain a final silica concentration of 20%. The resulting composition was then used to make a carbon fiber prepreg and cured composite panel, essentially as described in Example 3. The shear modulus of the cured composite was 6.5 GPa and can be compared to that of Comparative Example C-7 (only 5.0 Gpa).

Example 14

2-Methoxyethanol (60 g) was slowly added, with agitation, to Nalco™ 2327 hydrosol (25 g, 10.25 g silica) in each of 4 bottles. Organosilane surface treatment agents, as indicated in Table 9, were added to each of the bottles at a level of 0.5 mmol of organosilane per gram of silica.

TABLE 9

| Sample | Organosilane | Weight of Organosilane (g) |
| --- | --- | --- |
| 14A | N-Phenylaminopropyl trimethoxysilane | 1.310 |
| 4B | Phenyltrimethoxysilane | 1.015 |
| 14C | Phenethyltrimethoxysilane | 1.158 |
| 14D | Benzooxasilepin | 1.148 |

After addition of the silane, the bottles were allowed to stand for 1 hour at room temperature, additional 2-methoxyethanol (90 g) was added to each bottle, and the bottles were shaken, sealed, and placed in a steam bath for 18 hours. The bottles were then removed from the steam bath, allowed to cool to ambient temperature, and the ingredients of each bottle mixed with Epon™ 828 epoxy resin (15 g) in a 500 ml recovery flask. Volatile components were removed from the mixture using a rotary evaporator, with the final applied vacuum at 12 torr and the final temperature at 150° C. All samples formed stable, fluid, curable resin sols in Epon™ 828 epoxy resin. The organosilanes used in samples 14A and 14D contained functional groups capable of reacting with the epoxy groups of the curable resin (an aromatic secondary amine and a phenolic group), while the organosilanes used in samples 14B and 14C were not capable of reaction with the epoxy groups of the resin.

Comparative Example C-10

The ability of four additional organosilanes, indicated in Table 10, to form stable, fluid, curable resin sols was evaluated using essentially the procedure of Example 14.

TABLE 10

| Sample | Organosilane | Weight of Organosilane (g) |
|---|---|---|
| C-10A | 2-(3,4-Epoxycyclohexyl)-ethyltrimethoxysilane | 1.268 |
| C-10B | 3- Glycidoxypropyltrimethoxysilane | 1.241 |
| C-10C | 2-(3-Cyclohexenyl)ethyltrimethoxysilane | 1.186 |
| C-10D | p-(Chloromethyl) phenyltrimethoxysilane | 1.260 |

All of the samples formed clear fluid sols in the presence of both the organic liquid (2-methoxyethanol) and Epon™ 828 epoxy resin. However, gels formed near the end of the organic liquid removal process in all four samples. Thus, unlike the organosilanes of Example 14, the organosilanes of this Comparative Example 11 apparently did not form a compatibilizing interface between the inorganic microparticles and the curable resin (as is evidenced by the formation of gels as the last portions of organic liquid were removed from the mixture). This result is surprising in that the two organosilanes used in samples C-10A and C-10B were epoxy functional silanes. Yet an apparent lack of compatibility between the curable resin and the organosilanes resulted in particle to particle associations and gel formation.

Various modifications and alterations of this invention will become apparent to those skilled in the art without departing from the scope and spirit of the invention.

We claim:

1. A composition comprising (a) a curable resin sol comprising a colloidal dispersion of substantially spherical, substantially inorganic oxide microparticles in a curable resin, said microparticles having surface-bonded organic groups which serve to compatibilize said microparticles and said curable resin; and (b) reinforcing fibers; wherein said composition is essentially volatile-free.

2. The composition of claim 1 wherein said composition contains less than about 2 weight percent of volatile materials.

3. The composition of claim 1 wherein said curable resin comprises a resin selected from the group consisting of epoxy resins, curable imide resins, vinyl ester resins, acrylic resins, bisbenzocyclobutane resins, polycyanate ester resins, and mixtures thereof.

4. The composition of claim 3 wherein said curable resin comprises a resin selected from the group consisting of epoxy resins, maleimide resins, polycyanate ester resins, and mixtures thereof.

5. The composition of claim 4 wherein said curable resin comprises a resin selected from the group consisting of digycidyl ethers of bisphenol A, diglycidyl ethers of bisphenol F, ethylidene bis-4,1-phenylene dicyanate, N,N'-4,4'-diphenylmethanebismaleimide, 4,4'-(1-methylethylidene) bis(2-(2-propenyl)phenol), and mixtures thereof.

6. The composition of claim 4 wherein said curable resin comprises an epoxy resin or a mixture of epoxy resins.

7. The composition of claim 1 wherein said microparticles comprise silica, titania, alumina, zirconia, vanadia, chromia, iron oxide, antimony oxide, tin oxide, or mixtures thereof.

8. The composition of claim 7 wherein said microparticles comprise silica.

9. The composition of claim 1 wherein said microparticles have an average particle diameter in the range of from about 1 nanometer to about 1000 nanometers.

10. The composition of claim 9 wherein said range is from about 5 nanometers to about 500 nanometers.

11. The composition of claim 1 wherein said groups are derived from monohydric alcohols, polyols, organosilanes, organotitanates, or mixtures thereof.

12. The composition of claim 11 wherein said groups are derived from phenyltrimethoxy silane, benzooxasilepin dimethyl ester, phenethyltrimethoxy silane, N-phenylaminopropyl trimethoxysilane, or mixtures thereof.

13. The composition of claim 1 wherein said groups are present in an amount sufficient to enable the formation of a stable curable resin sol.

14. The composition of claim 1 wherein said sol contains from about 3 to about 50 volume percent of said microparticles.

15. The composition of claim 1 wherein said reinforcing fibers are continuous.

16. The composition of claim 1 wherein said reinforcing fibers comprise carbon, glass, ceramic, boron, silicon carbide, polyimide, polyamide, polyethylene, or combinations thereof.

17. The composition of claim 1 wherein said reinforcing fibers comprise a unidirectional array of individual continuous fibers, woven fabric, knitted fabric, yarn, roving, braided constructions, or non-woven mat.

18. The composition of claim 1 further comprising at least one additive selected from the group consisting of curing agents, cure accelerators, catalysts, crosslinking agents, dyes, flame retardants, pigments, impact modifiers, and flow control agents.

19. A composition comprising (a) a curable resin sol comprising a colloidal dispersion of substantially spherical, substantially inorganic microparticles in a curable resin, said microparticles comprising silica microparticles having surface-bonded organic groups which serve to compatibilize said microparticles and said curable resin, and said curable resin comprising epoxy resin; and (b) reinforcing fibers comprising carbon or glass; wherein said composition is essentially volatile-free.

20. A prepreg comprising the composition of claim 1.

21. A composite comprising the cured composition of claim 1.

22. An article comprising the composite of claim 21.

23. A process for preparing fiber-containing compositions having improved resin-dominated mechanical properties comprising the steps of (a) forming a mixture comprising at least one curable resin and at least one organosol, said organosol comprising volatile liquid and substantially spherical, substantially inorganic oxide microparticles, said microparticles having surface-bonded organic groups which serve to compatibilize said microparticles and said curable resin; (b) removing said volatile liquid from said mixture so as to form a curable resin sol; and (c) combining said mixture or said curable resin sol with reinforcing fibers so as to form an essentially volatile-free fiber-containing composition.

24. The process of claim 23 further comprising the step of curing said fiber-containing composition.

25. The process of claim 23 wherein said combining is carried out according to a process selected from the group consisting of resin transfer molding, pultrusion, and filament winding.

26. A prepreg prepared by the process of claim 23.

27. A composite prepared by the process of claim 24.

28. An article comprising the composite of claim 27.

29. A curable resin sol comprising an essentially volatile-free, colloidal dispersion of substantially spherical, substantially inorganic oxide microparticles in a curable resin, said microparticles having surface-bonded organic groups which render said microparticles compatible with said resin.

30. The sol of claim 29 wherein said sol contains less than about 2 weight percent of volatile materials.

31. The sol of claim 29 wherein said curable resin comprises a resin selected from the group consisting of epoxy resins, maleimide resins, polycyanate ester resins, and mixtures thereof.

32. The sol of claim 31 wherein said epoxy resin comprises an aromatic polyepoxide.

33. The sol of claim 32 wherein said aromatic polyepoxide comprises a polyglycidyl ether of a polyhydric phenol.

34. The sol of claim 29 wherein said microparticles have surface-bonded organic groups which serve to compatibilize said microparticles and said curable resin.

35. A curable resin sol comprising an essentially volatile-free, colloidal dispersion of substantially spherical, substantially inorganic microparticles in curable resin, said microparticles comprising silica and having surface-bonded organic groups which render said microparticles compatible with said resin, and said resin comprising epoxy resin.

* * * * *

UNITED STATES PATENT AND TRADEMARK OFFICE
CERTIFICATE OF CORRECTION

PATENT NO.: 5,648,407

DATED: July 15, 1997

INVENTOR(S): Douglas P. Goetz, Andrew M. Hine, William J. Schultz and Wendy L. Thompson It is certified that error appears in the above-identified patent and that said Letters Patent is hereby corrected as shown below:

Column 18, line 22, delete "148" and insert --1482--.

Signed and Sealed this

Eleventh Day of August 1998

Attest:

BRUCE LEHMAN

Attesting Officer

Commissioner of Patents and Trademarks